(12) United States Patent
Kim

(10) Patent No.: US 8,971,067 B2
(45) Date of Patent: Mar. 3, 2015

(54) OUTPUT CURRENT DISTORTION COMPENSATING APPARATUS IN INVERTER

(75) Inventor: Kwang Yeon Kim, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 257 days.

(21) Appl. No.: 13/078,869

(22) Filed: Apr. 1, 2011

(65) Prior Publication Data

US 2011/0273914 A1    Nov. 10, 2011

(30) Foreign Application Priority Data

May 6, 2010   (KR) .................. 10-2010-0042657

(51) Int. Cl.
*H02M 7/5395* (2006.01)
*H02M 1/12* (2006.01)
*H02M 7/5387* (2007.01)

(52) U.S. Cl.
CPC .............. *H02M 1/12* (2013.01); *H02M 7/5387* (2013.01)
USPC .............................................. 363/41; 363/98

(58) Field of Classification Search
USPC ............. 363/41, 42, 43, 55, 56, 131, 132, 95, 363/16, 37, 40, 96, 97, 98, 137; 318/400.13, 400.23, 254, 400.02, 318/400.33, 808
See application file for complete search history.

(56) References Cited

U.S. PATENT DOCUMENTS

2006/0133120 A1*  6/2006  Sato et al. .................... 363/37
2007/0290639 A1* 12/2007  Mori ............................ 318/254
2008/0106919 A1*  5/2008  Shin et al. .................... 363/131
2009/0129132 A1*  5/2009  Furutani et al. .............. 363/95
2010/0194319 A1*  8/2010  Ito et al. .................... 318/400.13

FOREIGN PATENT DOCUMENTS

| JP | 2-280671 | 11/1990 |
| JP | 9-121558 | 5/1997 |
| WO | 2009/040965 | 4/2009 |

OTHER PUBLICATIONS

The State Intellectual Property Office of the People's Republic of China Application Serial No. 201110113891.8, Office Action dated Apr. 17, 2013, 6 pages.
The State Intellectual Property Office of the People's Republic of China Application Serial No. 201110113891.8, Office Action dated Sep. 11, 2014, 6 pages.

* cited by examiner

*Primary Examiner* — Gary L Laxton
*Assistant Examiner* — Trinh Dang
(74) *Attorney, Agent, or Firm* — Lee, Hong, Degerman, Kang & Waimey

(57) ABSTRACT

An output current distortion compensating apparatus in an inverter is disclosed, the inverter including an inverter controller generating a PWM signal for controlling a PWM voltage generator, wherein the inverter controller includes a first dead time compensation voltage generator generating a compensation voltage based on an output current polarity of each phase in the inverter, and a second dead time compensation voltage generator generating a compensation voltage based on an output current waveform of each phase in the inverter, and wherein a first dead time compensation voltage outputted from the first dead time compensation voltage generator and a second dead time compensation voltage outputted from the second dead time compensation voltage generator are added to generate a final dead time compensation voltage, thereby preventing occurrence of hunting phenomenon in which a current is greatly fluctuated.

10 Claims, 3 Drawing Sheets

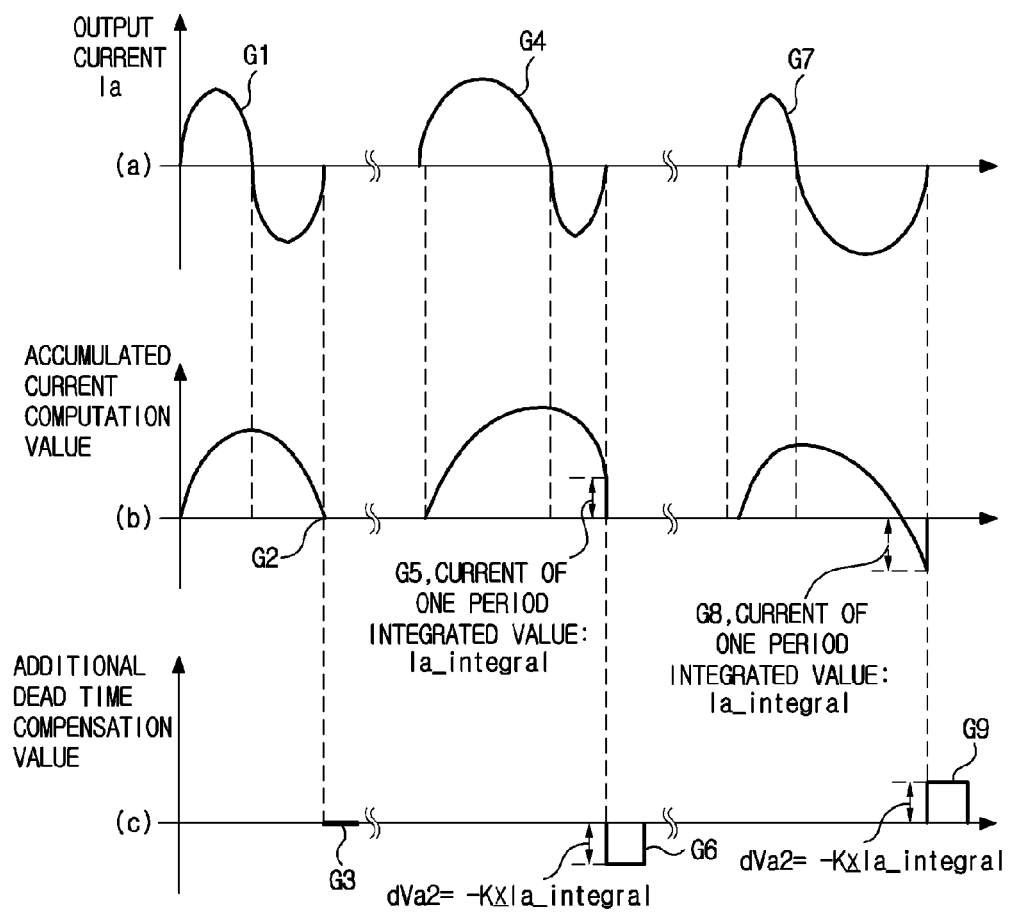

US 8,971,067 B2

OUTPUT CURRENT DISTORTION COMPENSATING APPARATUS IN INVERTER

CROSS-REFERENCE TO RELATED APPLICATION

Pursuant to 35 U.S.C. §119(a), this application claims the benefit of earlier filing date and right of priority to Korean Application Number 10-2010-0042657, filed May 6, 2010, the contents of which are hereby incorporated by reference herein in its entirety.

BACKGROUND OF THE INVENTION

1. Field of the Invention

The present disclosure relates to an output current distortion compensating apparatus in an inverter, and more particularly to an output current distortion compensating apparatus in an inverter configured to prevent an output current distortion in an inverter by generating an additional compensation voltage to cope with a distortion phenomenon of an output current caused by an error in a dead time compensation voltage.

2. Description of Related Art

An inverter for motor driving can be used for various purposes. Examples of the inverter for driving a motor may include industrial manufacturing facilities, building air conditioners and elevators. A conventional 3-phase inverter receives an electric power of 3-phase (R, S, T) to output a 3-phase output of U, V, and W phases to a motor, where two switching elements (divided to a +phase switching element and a +phase switching element based on current polarity) such as IGBTs (insulated gate bipolar transistors) are formed at each phase in order to control speed and current in the motor, and a desired current or voltage is outputted by turning on or off a relevant switching element in response to an inputted PWM (Pulse Width Modulation) control signal.

At this time, if a +phase switching element and a −phase switching element on the same phase are turned on, a current more than a threshold current exceeding a rated current of the switching element flows to break the switching elements, and in order to protect the switching elements against the breakage, a dead time is inserted to the PWM control signal controlling the switching element to protect the switching elements.

However, there is a disadvantage in the conventional method in that an actual dead time voltage is changed by ON/OFF characteristics of a power switch element, and a dead time compensation voltage generates an error responsive to noises detected by a current detector, where the error in turn generates a distortion to a voltage applied to an electric motor, leading to occurrence of hunting phenomenon in which current is greatly fluctuated.

SUMMARY OF THE INVENTION

The present disclosure is directed to solve the abovementioned disadvantages and/or problems and it is an object of the present disclosure to provide an output current distortion compensating apparatus in an inverter, configured to output a stable inverter PWM control signal by generating an additional dead time compensation voltage responsive to a distorted inverter output current, if vibration is generated in the inverter due to the inverter output current distorted by an error in a dead time compensation voltage.

Technical problems to be solved by the present disclosure are not restricted to the above-mentioned descriptions, and any other technical problems not mentioned so far will be clearly appreciated from the following description by skilled in the art.

An object of the invention is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present invention, there is provided an output current distortion compensating apparatus in an inverter, the inverter including an inverter controller generating a PWM signal for controlling a PWM voltage generator, wherein the inverter controller includes a first dead time compensation voltage generator generating a compensation voltage based on an output current polarity of each phase in the inverter, and a second dead time compensation voltage generator generating a compensation voltage based on an output current waveform of each phase in the inverter, and wherein a first dead time compensation voltage outputted from the first dead time compensation voltage generator and a second dead time compensation voltage outputted from the second dead time compensation voltage generator are added to generate a final dead time compensation voltage.

Preferably, the second dead time compensation voltage generator includes an accumulated current computation unit calculating an integrated value of a period relative to an output current of each phase in the inverter, and a second dead time compensation voltage generator generating a second dead time compensation voltage based on the integrated value of a period calculated by the accumulated current computation unit.

Preferably, each of the second dead time compensation voltages (dVa2, dVb2, dVc2) is generated by multiplying an additional compensation gain (−K) to the integrated value (positive or negative) of a period relative to an output current of each phase in the inverter.

Preferably, each of the second dead time compensation voltages (dVa2, dVb2, dVc2) is generated by multiplying an additional compensation gain (−K) to the integrated value of a period having a positive value, if an output current waveform of each phase is leaned to a positive direction.

Preferably, each of the second dead time compensation voltages (dVa2, dVb2, dVc2) is generated by multiplying an additional compensation gain (−K) to the integrated value of a period having a negative value, if an output current waveform of each phase is leaned to a negative direction.

The output current distortion compensating apparatus in an inverter according to the present disclosure has an advantageous effect in that a dead time compensation error generated by ON/OFF characteristics of a power switch element and noises detected by a current detector is reduced to decrease imbalance in voltage applied to an electric motor, thereby preventing occurrence of hunting phenomenon in which a current is greatly fluctuated.

BRIEF DESCRIPTION OF THE DRAWINGS

The teachings of the present disclosure can be readily understood by considering the following detailed description in conjunction with the accompanying drawings, in which:

FIG. 3 is a waveform diagram illustrating a method a second dead time compensation voltage from an accumulated current value of one period according to the present disclosure.

DETAILED DESCRIPTION OF THE INVENTION

Figure 1:
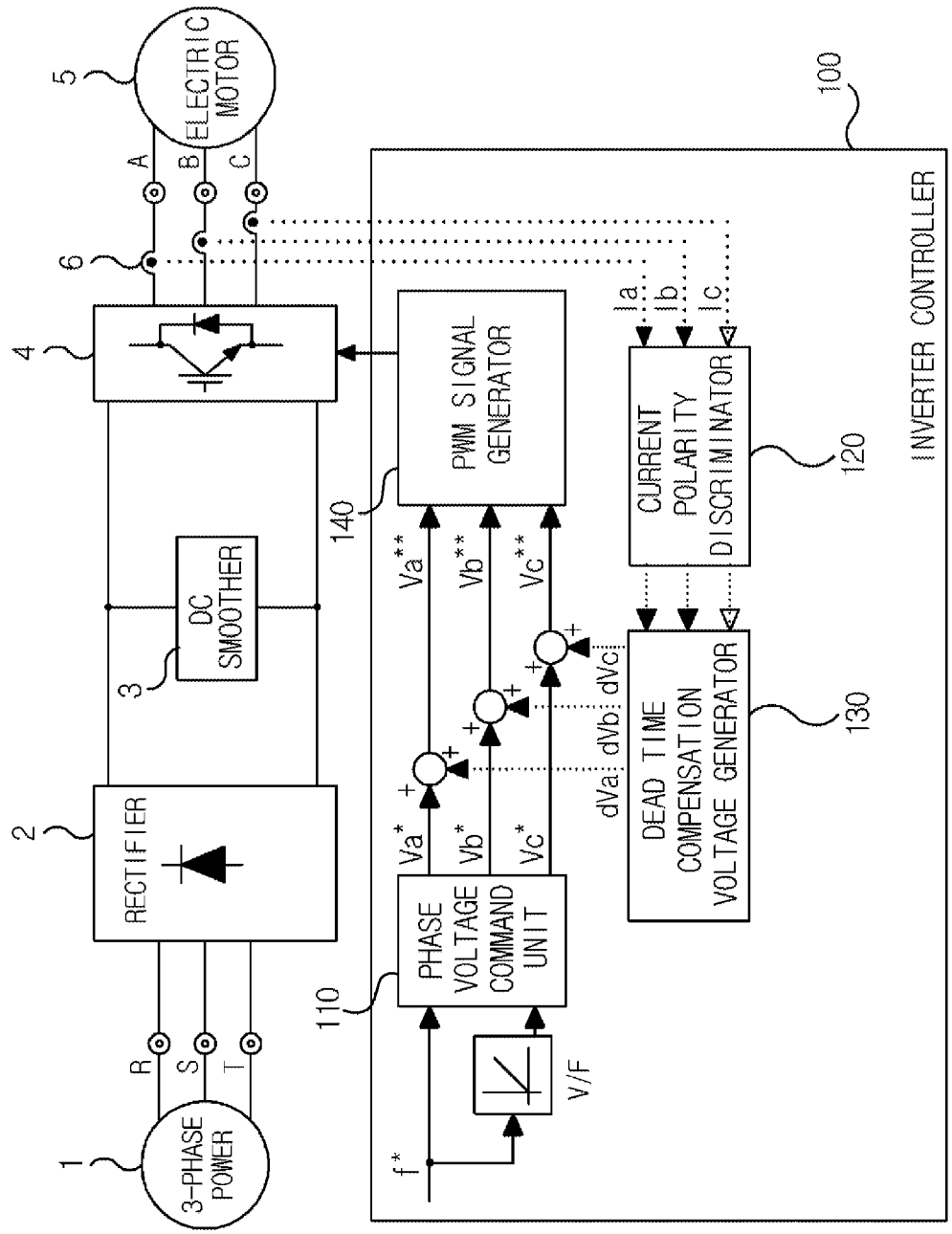
FIG. 1 is a block diagram illustrating an output current distortion compensating apparatus in an inverter.

The particulars shown herein are by way of example and for purposes of illustrative discussion of the embodiments of the present disclosure only and are presented in the cause of providing what is believed to be the most useful and readily understood description of the principles and conceptual aspects of the present disclosure.

In this regard, no attempt is made to show structural details of the present disclosure in more detail than is necessary for the fundamental understanding of the present disclosure, the description taken with the drawings making apparent to those skilled in the art how the several forms of the present disclosure may be embodied in practice.

This disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

In the drawings, the size and relative sizes of layers and regions may be exaggerated for clarity. Like numbers refer to like elements throughout, and explanations that duplicate one another will be omitted.

Now, the exemplary embodiments of an output current distortion compensating apparatus in an inverter according to the present disclosure will be explained in detail hereinbelow together with the figures.

FIG. 1 is a block diagram illustrating an output current distortion compensating apparatus in an inverter.

Referring to FIG. 1, an output current distortion compensating apparatus in an inverter includes a rectifier (2) receiving a power from a 3-phase power source (1) and converting a 3-phase alternating current (AC) to a direct current (DC), a DC smoother (3) smoothing the rectified voltage, a PWM (Pulse Width Modulation) voltage generator (4) generating a PWM voltage using a power switch element from a PWM generation signal of a PWM signal generator (140), an electric motor (5) generating a rotational force using the PWM generation voltage, a phase voltage command unit (110) making PWM output voltage commands (Va*, Vb*, Vc*) of each phase using a frequency and a voltage command, a current detector (6) detecting currents (Ia, Ib, Ic) of the electric motor, a current polarity discriminator (120) discriminating a polarity of each current using the detected currents, and a dead time compensation voltage generator (130) generating dead time compensation voltages (dVa, dVb, dVc) using the current polarity.

That is, an inverter controller (100) generating a PWM control signal outputs the PWM control signal by adding the dead time compensation voltage based on polarity of output current of the inverter for reducing influence of the dead time.

The phase voltage command unit (110) makes commands (Va*, Vb*, Vc*) of each phase voltage relative to present frequency commands using frequency commands and a predetermined V/F ratio.

The current polarity discriminator (120) discriminates polarity of each current from the currents (Ia, Ib, Ic) obtained from the current detector (6), and outputs +1 if the polarity of current is +, and outputs −1 if the polarity of current is −.

The dead time compensation voltage generator (130) generates dead time compensation voltages (dVa, dVb, dVc) using an output of the current polarity discriminator (120). Computation of the dead time compensation voltage is such that the dead time compensation voltage generator (130) generates a voltage (+dV) corresponding to a dead time of the current polarity being +, and generates a voltage (−dV) corresponding to a dead time of the current polarity being −.

Now, the output current distortion compensating apparatus in an inverter according to an exemplary embodiment of the present disclosure will be described in detail.

Figure 2:
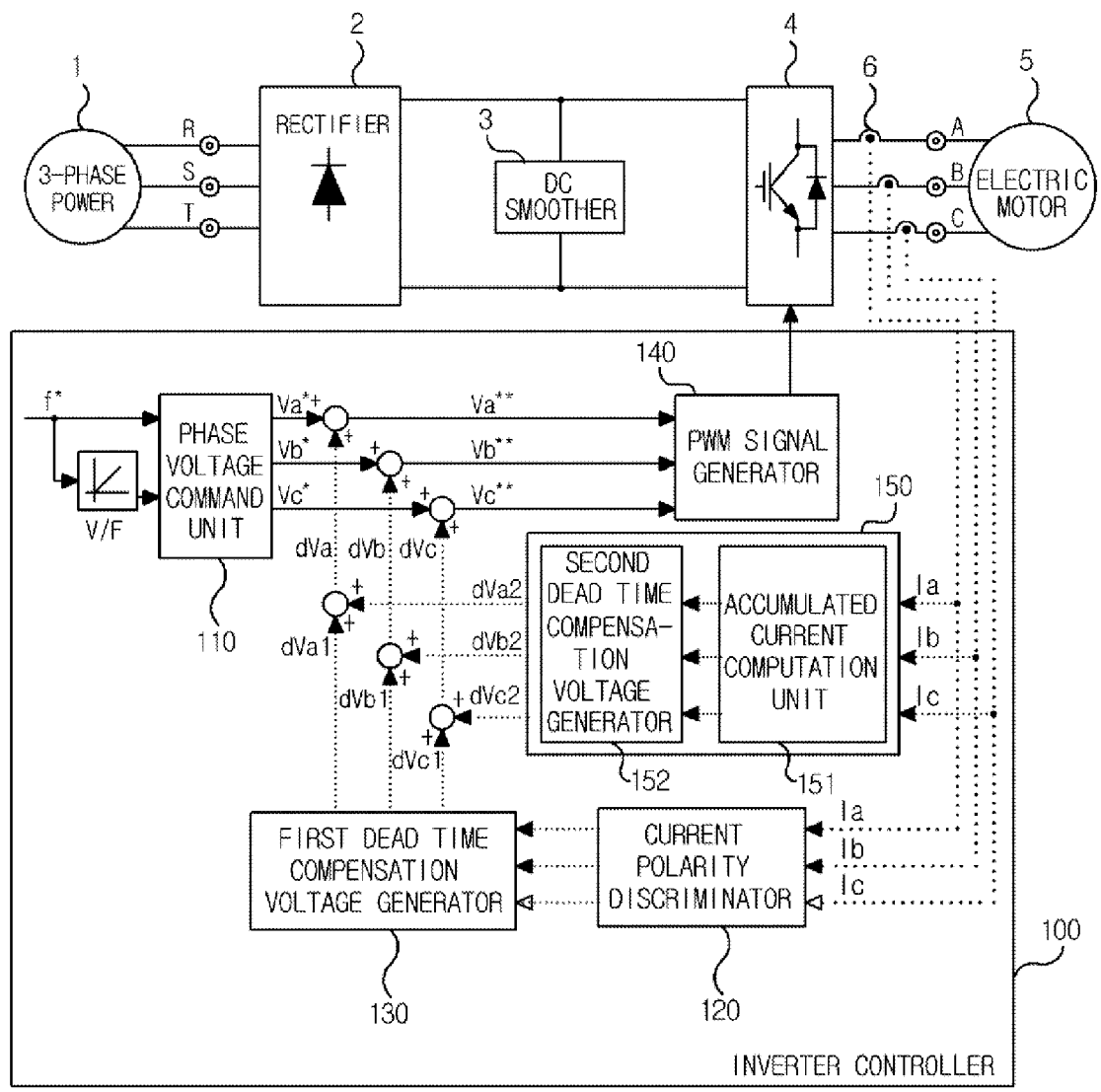
FIG. 2 is a block diagram illustrating an output current distortion compensating apparatus in an inverter according to an exemplary embodiment of the present disclosure.

FIG. 2 is a block diagram illustrating an output current distortion compensating apparatus in an inverter according to an exemplary embodiment of the present disclosure.

Referring to FIG. 2, the output current distortion compensating apparatus in an inverter according to an exemplary embodiment of the present disclosure includes a rectifier (2) receiving a power from a 3-phase power source (1) and converting a 3-phase alternating current (AC) to a direct current (DC), a DC smoother (3) smoothing the rectified voltage, a PWM (Pulse Width Modulation) voltage generator (4) generating a PWM voltage using a power switch element from a PWM generation signal of a PWM signal generator (10), an electric motor (5) generating a rotational force using the PWM generation voltage, and an inverter controller (100) generating the PWM signal.

The inverter controller (100) includes a phase voltage command unit (110) making voltage commands (Va*, Vb*, Vc*) of each phase using a frequency and a voltage command, a current polarity discriminator (120) discriminating a polarity of each current using the currents detected by the current detector (6) detecting the currents (Ia, Ib, Ic) of the electric motor (5), a first dead time compensation voltage generator (130) generating first dead time compensation voltages (dVa1, dVb1, dVc1) using the discriminated current polarity, and an additional dead time compensation voltage generator (150).

Referring to FIG. 2 again, the inverter supplies the 3-phase AC input power applied from the 3-phase power source to the DC smoother (3) through the rectifier (2), and the PWM voltage generator (4) generates a PWM voltage using the power switch elements (e.g., IGBT) according to the PWM control signal outputted from the PWM signal generator (140) of the inverter controller (100) and supplies the PWM voltage to the electric motor (5).

The first dead time compensation voltage generator (130) generates the first dead time compensation voltages (dVa1, dVb1, dVc1) by receiving the polarity of current through the current polarity discriminator (120) discriminating a polarity of each current using the currents detected by the current detector (6), which is an output of the current detector (6), where the current polarity discriminator (120) discriminates polarity of each current from the currents (Ia, Ib, Ic) obtained from the current detector (6), and outputs +1 if the polarity of current is +, and outputs −1 if the polarity of current is −.

That is, the first dead time compensation voltage generator (130) outputs the first dead time compensation voltages (dVa1, dVb1, dVc1) using the output of the current polarity discriminator (120). Computation of the dead time compensation voltage is such that the first dead time compensation voltage generator (130) generates a voltage (+dV) corresponding to a dead time of the current polarity being +, and generates a voltage (−dV) corresponding to a dead time of the current polarity being −.

At this time, the first dead time compensation voltage outputted from the first dead time compensation voltage generator (130) may differ based on ON/OFF characteristics of power switch elements (e.g., IGBT) and have an error according to noises detected by the current detector.

Thus, the output current distortion compensating apparatus in an inverter according to an exemplary embodiment of the present disclosure includes the additional dead time compensation voltage generator (150) that generates an additional dead time compensation voltage responsive to types of distorted currents detected by the current detector (6) so as to maintain a sine wave where a current flowing in the motor is not leaned to +nor to −.

The additional dead time compensation voltage generator (150) includes an accumulated current computation unit (151) accumulating a current of each phase for a period, and a second dead time compensation voltage generator (152) generating additional dead time compensation voltages (dVa2, dVb2, dVc2) using an accumulated current value.

The second dead time compensation voltage generator (152) generates the second dead time compensation voltages (dVa2, dVb2, dVc2) by multiplying a gain to the accumulated current value of a period from the accumulated current computation unit (151) accumulating a current of each phase for a period.

FIG. 3 is a waveform diagram illustrating a method a second dead time compensation voltage from an accumulated current value of one period according to the present disclosure.

Referring to FIG. 3, FIG. 3(a) shows a waveform of an output current (Ia), FIG. 3(b) illustrates an accumulated current computation value and FIG. 3 (c) depicts an additional dead time compensation value.

In case a current is a sine wave (i.e., a balanced state that is not leaned to a positive or to negative side) as in the waveform of the detected output current Ia (G1), an integrated value of a current during a period (accumulated current computation value) becomes zero as a waveform (G2), and the additional dead time compensation value (second dead time compensation voltage dVa2) becomes zero referring to a waveform (G3).

Meanwhile, in a case a current is leaned to a positive side as in the waveform Ia (G4) of the detected output current, an integrated value of a current during a period (accumulated current computation value: G5) becomes a positive value, whereby a correction voltage of a negative value must be provided to the output voltage in the next period in order to reduce an offset of positive direction, and the size of the correction voltage must be proportional to an integrated value of a current during a period. That is, the additional dead time compensation value (G6: second dead time compensation voltage dVa2) becomes −k*Ia_integral, where K is a compensation gain, and becomes Ia_integral is an integrated value of a current of Ia phase during a period.

Meanwhile, in a case a current is leaned to a negative side as in the waveform Ia (G7) of the detected output current, an integrated value of a current during a period (accumulated current computation value: G8) becomes a negative value, whereby a correction voltage of a positive value must be provided to the output voltage in the next period in order to reduce an offset of negative direction, and the size of the correction voltage must be proportional to an integrated value of a current during a period. That is, the additional dead time compensation value (G9: second dead time compensation voltage dVa2) becomes −k*Ia_integral. Although a detected current (Ia) of one phase has been described in the exemplary embodiment of the present disclosure, the same applies to the second dead time compensation voltages (dVb2, dVc2) relative to the detected current (Ib, Ic) of each phase.

Referring to FIG. 2 again, a final dead time compensation voltages (dVa, dVb, dVc) are generated by adding the first dead time compensation voltages (dVa1, dVb1, dVc1) outputted by the first dead time compensation voltage generator (130) of each phase to the second dead time compensation voltages (dVa2, dVb2, dVc2) outputted by the second dead time compensation voltage generator (152) of each phase.

Therefore, the PWM signal generator (140) generates a PWM signal from final output voltage commands (Va, Vb, Vc**) of each phase in which the final dead time compensation voltages (dVa, dVb, dVc) and voltage commands (Va*, Vb*, Vc*) of each phase generated by phase commend (110) are added voltage commands.

As apparent from the foregoing, the output current distortion compensating apparatus in an inverter according to the present disclosure has an industrial applicability and advantage in that a dead time compensation error generated by ON/OFF characteristics of a power switch element and noises detected by a current detector is reduced to decrease imbalance in voltage applied to an electric motor, thereby preventing occurrence of hunting phenomenon in which a current is greatly fluctuated.

The above-mentioned output current distortion compensating apparatus in an inverter according to the present disclosure may, however, be embodied in many different forms and should not be construed as limited to the exemplary embodiments set forth herein. Thus, it is intended that embodiments of the present disclosure may cover the modifications and variations of this disclosure provided they come within the scope of the appended claims and their equivalents. While particular features or aspects may have been disclosed with respect to several embodiments, such features or aspects may be selectively combined with one or more other features and/or aspects of other embodiments as may be desired.

What is claimed is:

1. An apparatus for controlling an inverter, the apparatus comprising:
   a phase voltage command unit configured to generate a voltage command for the inverter using a frequency command and a prescribed voltage to frequency ratio;
   a detector configured to detect a output current of the inverter;
   a first compensation voltage generator configured to generate a first compensation voltage based on a polarity of the output current of the inverter, the first compensation voltage including a voltage compensating the voltage command during a dead-time;
   an additional compensation voltage generator configured to generate a second compensation voltage based on a waveform of the output current of the inverter, the second compensation voltage including a voltage compensating the voltage command during the dead-time; and
   a pulse-width modulation (PWM) signal generator configured to generate a PWM signal based on a final voltage command obtained by adding the first and second compensation voltages, wherein the PWM signal is inputted to the inverter;

wherein the additional compensation voltage generator includes:

an accumulator configured to accumulate the output current of the inverter for a period; and a second compensation voltage generator configured to generate the second compensation voltage based on an accumulation of the output current of the inverter for the period and to generate a negative voltage as the second compensation voltage when the accumulation of the output current of the inverter for the period is positive.

2. The apparatus of claim 1, further comprising a discriminator configured to determine the polarity of the output current of the inverter.

3. The apparatus of claim 1, wherein the second compensation voltage is proportional to the accumulation of the output current of the inverter for the period.

4. The apparatus of claim 1, wherein the second compensation voltage generator is configured to generate the second compensation voltage by multiplying a negative gain and the accumulation of the output current of the inverter for the period is positive.

5. The apparatus of claim 1, wherein the second compensation voltage generator is configured to generate a positive voltage as the second compensation voltage when the accumulation of the output current of the inverter for the period is negative.

6. The apparatus of claim 1, further comprising an adder configured to add the voltage command, the first compensation voltage, and the second compensation voltage to output the final voltage command.

7. The apparatus of claim 1, wherein a magnitude of the first compensation voltage is prescribed according to the inverter.

8. The apparatus of claim 2, wherein the first compensation voltage generator is configured to generate a positive voltage as the first compensation voltage when the polarity of the output current of the inverter is positive.

9. The apparatus of claim 2, wherein the first compensation voltage generator is configured to generate a negative voltage as the first compensation voltage when the polarity of the output current of the inverter is negative.

10. The apparatus of claim 5, wherein the second compensation voltage generator is configured to generate the second compensation voltage by multiplying a positive gain and the accumulation of the output current of the inverter for the period is negative.

* * * * *